United States Patent
Muramoto et al.

(10) Patent No.: US 6,218,485 B1
(45) Date of Patent: Apr. 17, 2001

(54) PROCESS FOR PRODUCING NARROW POLYDISPERSITY ALKENYLPHENOL POLYMER

(75) Inventors: Hiroo Muramoto; Yukikazu Nobuhara; Eiichiro Kobayashi, all of Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 09/556,985

(22) Filed: Apr. 24, 2000

Related U.S. Application Data

(63) Continuation-in-part of application No. 09/026,522, filed on Feb. 20, 1998, now abandoned, which is a continuation-in-part of application No. 08/715,410, filed on Sep. 18, 1996, now abandoned.

(30) Foreign Application Priority Data

Sep. 19, 1995 (JP) .................................... 7-264921
Sep. 19, 1995 (JP) .................................... 7-264922

(51) Int. Cl.$^7$ ............... C08F 4/46; C08F 12/24; C08F 16/22
(52) U.S. Cl. ................ 526/87; 526/79; 526/173; 526/181; 526/313; 526/328; 526/328.5; 526/335; 526/340; 526/346; 526/347; 525/328.9; 525/355
(58) Field of Search ................ 526/79, 87, 173, 526/313, 181, 328, 328.5, 335, 340, 346, 347; 525/328.9, 355

(56) References Cited

U.S. PATENT DOCUMENTS

| | | | |
|---|---|---|---|
| 3,488,332 | 1/1970 | Hiraoka et al. | 260/83.7 |
| 4,517,349 | 5/1985 | Fujiwara et al. | 526/313 |
| 4,764,572 | * 8/1988 | Bean, Jr. | 526/87 |
| 4,791,176 | 12/1988 | Birkle et al. | 525/326.5 |
| 5,081,191 | 1/1992 | Quirk | 525/288 |

FOREIGN PATENT DOCUMENTS 5-148324 * 6/1993 (JP) .
6-298869 10/1994 (JP) .

* cited by examiner

Primary Examiner—Fred Teskin
(74) Attorney, Agent, or Firm—Jacobson, Price, Holman & Stern, PLLC

(57) ABSTRACT

A process for producing a monodisperse polymer which has a number-average molecular weight from 1,000 to 100,000 and a molecular weight distribution Mw (weight-average molecular weight)/Mn (number-average molecular weight)= 1.00 through 1.50 is disclosed. This process comprises: homopolymerizing or random copolymerizing an anionic polymerizable compound by living anionic polymerization using an organic alkali metal and/or an alkali metal as a polymerization initiator, wherein a target molecular weight is obtained by adding the compound divided into multiple steps.

13 Claims, No Drawings

PROCESS FOR PRODUCING NARROW POLYDISPERSITY ALKENYLPHENOL POLYMER

This is a continuation-in-part of application Ser. No. 09/026,522, filed Feb. 20, 1998, (now abandoned) which is a continuation-in-part of application Ser. No. 08/715,410, filed Sep. 18, 1996, now abandoned.

BACKGROUND OF THE INVENTION

1. Field of the Invention

The present invention relates to a process for producing a monodisperse polymer and, more specifically, to a process for producing on an industrial scale a monodisperse polymer having a controlled molecular weight and a controlled molecular weight distribution by living anionic polymerization.

2. Description of the Related Art

It has been known for a long time that polymers having a controlled structure are obtained from conjugated dienes, vinyl aromatic compounds and (meth)acrylic acid esters by living anionic polymerization using an alkali metal or organic alkali metal.

It has also been known that an alkenylphenol polymer typically represented by p-vinylphenol is useful as a resist material, a curing agent for epoxy resins, an antioxidant and the like.

As for processes for producing alkenylphenol polymers, several processes have been proposed including: thermal radical polymerizations to give a polymer of p-vinylphenol (JP-A 53-13694, JP-A 57-44067, JP-A 57-44608, JP-A 57-44609, and JP-B 61-2683); radical polymerization of a p-vinylphenol wherein the hydroxyl group of p-vinylphenol is protected by a saturated aliphatic protecting group and a treatment with an acidic reagent follows to give a polymer of p-vinylphenol (JP-A 4-279608 and 6-298862); and an anionic polymerization of p-vinylphenol wherein the hydroxyl group of p-vinylphenol is protected by tert-butyl dimethyl silyl group and a treatment with an acidic reagent follows to give a polymer of p-vinylphenol having a sharp molecular-weight distribution [Yuki-Gosei Kagaku 44, 2, 45 (1986)]. Further, the present inventors have proposed the homopolymerization or the copolymerization of alkenylphenol wherein the hydroxyl group of alkenylphenol is protected by a saturated aliphatic protecting group and detachment of the protecting group follows to give a narrow polydispersity polymer of alkenylphenol (JP -A 3-277608 and 4-53807).

The living anionic polymerization is suitable for the synthesis of a polymer such as an oligomer having a molecular weight of several thousands and a polymer having a controlled molecular weight and a controlled molecular weight distribution can be obtained with ease by the living anionic polymerization if it is in small quantity. However, when it is adapted to the synthesis or industrial-scale production of a polymer having a molecular weight of several tens of thousand even if it is in small quantity, it is difficult to completely eliminate the effect of an active hydrogen-containing compound such as water introduced into a reaction system. Therefore, the living anionic polymerization involves the above problem to be solved for the precise control of the molecular weight of a polymer though it can control molecular weight distribution.

Recently, development of a homopolymer of a copolymer, having a phenolic hydroxyl group and a controlled structure, of alkenylphenol are desired for a resist material which achieves submicron resolution, and used for super-LSI manufacturing, as well as for a separation membrane and for a biocompatible polymeric material.

The above-mentioned polymers obtained by thermal or radical polymerization of p-vinylphenol have the following disadvantages: broad molecular weight distributions, uncontrolled structures, unremovable impurity, and easy discoloration.

Anionic polymerization of p-vinylphenol, the hydroxyl group of which is protected by tert-butyl dimethyl silyl group in advance, also has a practical disadvantage; i.e., tert-butyl dimethyl silyl chloride, which is used for the silylation, is extremely expensive.

On the other hand, the method proposed earlier by the present inventors has advantages: easy achievements of a controlled molecular weight, a controlled molecular weight distribution, and a controlled copolymer structure of alkenylphenol. In an industrial production, however, it has been found difficult to eliminate the effect of active hydrogen in such a compound as water; i.e., a precise control of molecular weight remains further to be accomplished, though the molecular weight distribution could be placed under control even in a large-scale production.

SUMMARY OF THE INVENTION

The present invention has been made in view of this and it is an object of the present invention to provide an industrial process for producing a monodisperse polymer of a conjugated diene, vinyl aromatic compound or (meth) acrylic acid ester having a controlled molecular weight and a controlled molecular weight distribution, and further a monodisperse alkenylphenol polymer.

The inventors of the present invention have conducted intensive studies to attain the above object and have found that in a process for homopolymerizing or random copolymerizing an anionic polymerizable compound such as a conjugated diene, vinyl aromatic compound or (meth) acrylic acid ester by living anionic polymerization, and a process for obtaining an alkenylphenol polymer by homopolymerizing a compound having the hydroxyl group of alkenylphenol with a saturated aliphatic protecting group or random copolymerizing the compound with a compound copolymerizable with the compound by living anionic polymerization and the eliminating the saturated aliphatic protecting group, a monodisperse polymer or monodisperse alkenylphenol polymer having a precisely controlled molecular weight is obtained by adding the compound(s) divided in multiple steps. The present invention has been accomplished based on this finding.

The present invention provides a process for producing a monodisperse polymer having a number-average molecular weight of 1,000 to 100,000 and a molecular weight distribution Mw (weight-average molecular weight)/Mn (number-average molecular weight)=1.00 to 1.50 characterized in that in the homopolymerization or random copolymerization of an anionic polymerizable compound by living anionic polymerization using an organic alkali metal and/or an alkali metal as a polymerization initiator, a target molecular weight is obtained by adding the compound divided in multiple steps.

Particularly, the above process is characterized in that the anionic polymerizable compound is a conjugated diene, vinyl aromatic compound or (meth)acrylic acid ester and the monomers are divided an added in two steps.

More particularly, the present invention is directed to a process for producing narrow polydispersity alkenylphenol polymer which has a number-average molecular weight from 1,000 to 100,000 and a molecular weight distribution Mw (weight-average molecular weight)/Mn (number-average molecular weight)=1.00 through 1.50, comprising subjecting a compound, of which OH group of the phenol residue is protected with a saturated aliphatic protecting group, to homopolymerization or random copolymerization with a copolymerizable monomer; and thereafter, eliminating the saturated aliphatic protecting group to get an alkenylphenol polymer:

the compound mentioned above being represented by the following formula I

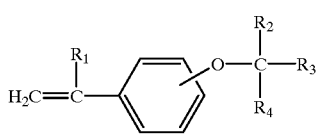

(I)

where $R_1$ is hydrogen or methyl group, and $R_2$, $R_3$ and $R_4$ are respectively and independently hydrogen or an alkyl group containing 1 through 6 carbon atoms:

the homopolymerization or copolymerization mentioned above being a living anion polymerization using an organic alkali metal compound and/or an alkali metal as the initiator;

the process mentioned above being characterized in that a polymerization for adjusting the molecular weight is carried out by a first step preliminary polymerization the monomers in amounts corresponding to 50/100 through 95/100 of the target molecular weight and second step wherein the monomers are added in amounts required for obtaining the target molecular weight.

DESCRIPTION OF THE PREFERRED EMBODIMENTS

The present invention will be described in detail hereinunder.

The conjugated diene used in the present invention is generally a conjugated diene having 4 to 12 carbon atoms such as 1,3-butadiene, isoprene, 2,3-dimethyl-1,3butadiene, 1,3-pentadiene, 2-methyl-1,3-pentadiene, 1,3-hexadiene, 4,5-diethyl-1,3-octadiene, 3-butyl-1,3-octadiene or the like.

Illustrative examples of the vinyl aromatic compound include styrene, o-methylstyrene, p-methylstyrene, a-methylstyrene, p-t-butylstyrene, 1,3-dibutylstyrene, vinylnaphthalene, divinylbenzene, 1,1-diphenylethylene and the like.

Illustrative examples of the (meth)acrylic acid ester include methyl acrylate, methyl methacrylate, ethyl acrylate, ethyl methacrylate, n-propyl acrylate, a n-propyl methacrylate, isopropyl acrylate, isopropyl methacrylate, n-butyl acrylate, n-butyl methacrylate, t-butyl acrylate, t-butyl methacrylate, 2-ethylhexyl acrylate, 2-ethylhexyl methacrylate, isodecyl acrylate, isodecyl methacrylate, issoctyl acrylate, isooctyl methacrylate, lauryl acrylate, lauryl methacrylate, cyclohexyl acrylate, cyclohexyl methacrylate, tetrahydrofuranyl acrylate, tetrahydrofuranyl methacrylate, tetrahydropyranyl acrylate, tetrahydropyranyl methacrylate, 3-oxocyclohexyl acrylated, 3-oxocyclohexyl methacrylate, butyrolactone acrylate, butyrolactone methacrylate, mepaloniclactone methacrylate, trimethylsilyl acrylate, trimethylsilyl methacrylate, isopropyldimethyl silyl acrylate, isopropyldimethylsilyl methacrylate, t-butyldimethylsily 1 acrylate, t-butyldimethylsilyl methacrylate, phenyldimethylsilyl acrylate, phenyldimethylsilyl methacrylate, 1-adamantyl acrylate, 1-adamantyl methacrylate, 2-methyl-2-adamantyl acrylate, 2-methyl-2-adamantyl methacrylate, 1-methyleneadamantyl acrylate, 1-methyleneadamantyl methacrylate, 1-ethyleneadamantyl acrylate, 1-ethyleneadamantyl methacrylate, 3,7-dimethyl-1-adamantyl acrylate, 3,7-dimethyl-1-adamantyl methacrylate, isobornyl acrylate, isobornyl methacrylate, tricyclodecanyl acrylate, tricyclodecanyl methacrylate, norbornane acrylate, norbornane methacrylate and the like. They are used alone or admixture of tow or more.

Examples of the compounds represented by the general formula I above include p-methoxystyrene, p-n-butoxystyrene, p-sec-butoxystyrene, p-tert-butoxystyrene, m-tert-butoxystyrene, p-tert-butoxy-α-methylstyrene, and m-tert-butoxy-α-methylstyrene; p-tert-butoxystyrene and p-tert-butoxy-α-methylstyrene being particularly preferable.

Examples of the compounds random copolymerizable with the compound represented by the formula I above include conjugated dienes and aromatic vinyl compounds described above. These compounds can be used alone or two or more such compounds can be used in combination.

Examples of the compounds copolymerizable with the compound represented by the formula I include aromatic vinyl compounds such as styrene, o-methylstyrene, p-methylstyrene, α-methylstyrene, p-tert-butylstyrene, 1,3-butylstyrene, vinylnaphthalene, and divinylbenzene; conjugated dienes such as 1,3-butadiene, isoprene, 2,3-dimethyl-1,3-butadiene, 1,3-pentadiene, and 1,3-hexadiene; (meth) acrylic esters such as methyl (meth)acrylate, ethyl (meth) acrylate, and butyl (meth) acrylate; vinylpyridines such as 2-vinylpyridine and 4-vinylpyridine; and acrylonitrile. These compounds can be used alone or two or more such compounds can be used in combination.

Examples of the polymerization initiators usable include alkali metals such as lithium, sodium, and potassium; and organic alkali metals such as ethyl lithium, n-butyl lithium, sec-butyl lithium, tert-butyl lithium, butadienyl dilithium, butadienyl disodium, lithium biphenyl, lithium napthalene, lithium triphenyl, sodium biphenyl, sodium naphthalene, sodium triphenyl, α-methylstyrene-sodium anion, 1,1-diphenyl hexyl lithium, and 1,1-diphenyl-3-methylpentyl lithium.

The monodisperse polymer production process of the present invention is carried out by dividing and adding to a reaction system the above anionic polymerizable compound or a compound represented by the general formula (I) alone or a mixture of the same and a compound copolymerizable with the same in an appropriate organic solvent in the presence of the above alkali metal and/or organic alkali metal as a polymerization initiator at a temperature of −100 to +100° C. in the atmosphere of an inert gas such as nitrogen or argon. The compound or the mixture may be divided into three or more portions and added separately but is preferably divided into two portions and added separately. In this case, first stage preliminary polymerization is carried out using a monomer in an amount corresponding to 50/100 to 95/100 of the target molecular weight and an appropriate means is used to measure the molecular weight to estimate the mount of the monomer required to obtain the target molecular weight. Second stage polymerization is carried out to control the molecular weight by adding the required amount of the monomer.

When the amount of the monomer added is less than 50/100 of the target molecular weight, the amount of the monomer added in the second stage is too large with the result of a wide molecular weight distribution. On the other hand, when the amount of the monomer is more than 95/100, the molecular weight at the time of the production of a polymer may exceed the target value greatly in the first stage. Both cases are not preferable.

Illustrative examples of the polymerization solvent include aliphatic hydrocarbons such as n-hexane and n-heptane; alicyclic hydrocarbons such as cyclohexane and cyclopentane; aromatic hydrocarbons such as benzene and toluene; aliphatic ethers such as diethyl ether; cyclic ethers such as tetrahydrofuran and dioxane; and the like. An organic solvent or a mixture solvent of two or more organic solvents which are generally used for anionic polymerization is used.

Particularly, in the homopolymerization of the compound represented by the general formula (I) or the random copolymerization of the compound and a compound copolymerizable with the compound, as the polymerization solvent is preferably used a mixture solvent of at least one nonpolar solvent selected from the group consisting of the above aliphatic hydrocarbons, alicyclic hydrocarbons and aromatic hydrocarbons and the above cyclic ether. In this case, as for the mixing ratio of the nonpolar solvent to the cyclic ether, the cyclic ether is preferably contained in an amount of 1 to 50wt %. When the amount is less than 1 wt %, the growth rate is remarkably slow and it takes too long to complete polymerization, which is economically disadvantageous. On the other hand, when the amount is more than 50 wt %, the growth rate is faster than the initiation rate, thereby making it difficult to control the molecular weight in the first-stage preliminary polymerization unfavorably.

A functional group such as a carboxyl group or an alcoholic hydroxyl group can be introduced, using carbon dioxide or a cyclic ether such as ethylene oxide respectively, followed by a treatment with water, hydrochloric acid, and/or methanol, to the end of the polymer chain after the completion of polymerization.

The reaction, eliminating the saturated aliphatic protecting group, can be carried out in the range from room temperature through 150° C., more preferably room temperature through 100° C.; where the protecting group can be eliminated from the homopolymer or copolymer of the compound of general formula I to form the skeleton chiefly comprising alkenylphenol, in a solvent mentioned in the paragraph above such as aliphatic hydrocarbons, aromatic hydrocarbons, or alicyclic hydrocarbons; and in addition, in alcohols such as methanol and ethanol; in ketonic solvents such as acetone and methyl ethyl ketone; in cellosolves such as ethyl cellosolve; and in halogenated hydrocarbons such as hydrogen tetrachloride; using as a catalyst an acidic reagent such as hydrochloric acid, hydrogen chloride gas, hydrobromic acid, 1,1,1-trifluoroaetic acid, p-toluene-sulfonic acid, methane sulfonic acid, and hydro-borofluoric acid. In this reaction, side reactions such as scission and cross-linking of the polymer chain, and thus a change in molecular weight distribution scarcely occurs.

Now, the present invention is explained in more detail by referring examples and comparative examples. The scope of this invention, however, is by no means restricted by these examples.

In the examples below, "parts" and "%" are based on weight, unless otherwise stated.

EXAMPLE 1

The following living anionic polymerization of a butadiene homopolymer was carried out with a target number-average molecular weight (to be abbreviated as Mn hereinafter) of 10,000.

In a nitrogen atmosphere, an Na-kerosene dispersion containing 41.2 mmols of Na was added to 1,000 g of tetrahydrofuran, the temperature was kept at −60° C. under agitation, 3.24 moles of butadiene was added dropwise in one hour as a first stage, the reaction was continued for two more hours, and the completion of the reaction was confirmed by gas chromatography (to be abbreviated as GC hereinafter). When the reaction solution was analyzed by GPC, Mn was found to be 8,500 and the amount of butadiene required to obtain the target molecular weight was found to be 0.57 mole.

As a second stage, 0.57 mole of butadiene was added dropwise in 30 minutes, the reaction was continued for two more hours, and the completion of the reaction was confirmed by GC.

Thereafter, methanol was added to the reaction system to stop the reaction, water was added to separate the reaction product, and the solvent was removed from an organic layer at a reduced pressure to produce a half-solid butadiene homopolymer. The polymerization yield was 98.8% of the total amount of butadiene used.

When the obtained polymer was measured by GPC, it was a monodisperse polymer having an Mn of 10,050 and an Mw/Mn of 1.08.

It was confirmed from the above results that a monodisperse butadiene homopolymer having a target molecular weight was obtained by the two stage polymerization of the present invention.

EXAMPLE 2

The following living anionic polymerization of a styrene homopolymer was carried out with a target Mn of 20,000.

In a nitrogen atmosphere, 10.0 mmols of n-butyl lithium was added to a solvent mixture consisting of 500 g of toluene and 500 g of tetrahydrofuran, the temperature was kept at −40° C. under agitation, 1.68 moles of styrene was added dropwise in one hours as a first stage, the reaction was continued for two more hours, and the completion of the reaction was confirmed by GC. When the reaction solution was analyzed by GPC, Mn was found to be 17,530 and the amount of styrene required to obtain the target molecular weight was found to be 0.24 mole.

As a second stage, 0.24 mole of styrene was added dropwise in 30 minutes, the reaction was continued for two more hours, and the completion of the reaction was confirmed by GC.

Thereafter, methanol was added to the reaction system to stop the reaction, the reaction solution was added to a large amount of methanol to deposit a polymer, and the deposited polymer was filtered, washed and dried at 60° C. at a reduced pressure for 5 hours to produce styrene homopolymer white powders. The polymerization yield was 99.3% of the total amount of styrene used.

When the obtained styrene homopolymer was measured by GPC, it was a monodisperse polymer having an Mn of 19,980 and an Mw/Mn of 1.10.

It was confirmed from the above results that a styrene homopolymer having a target molecular weight was obtained by the two stage polymerization of the present invention.

EXAMPLE 3

The following living anionic polymerization of a t-butyl methacrylate homopolymer was carried out with a target Mn of 6,000.

In a nitrogen atmosphere, 34.2 mmols of a s-butyl lithium was added to 1,000 g of tetrahydrofuran, the temperature was kept at −60° C. under agitation, 1.23 moles of t-butyl methacrylate was added dropwise in one hour as a fist stage, the reaction was continued for two more hours, and the completion of the reaction was confirmed by GC. When the reaction solution was analyzed by GPC, Mn was found to be 5,100 and the amount of t-butyl methacrylate required to obtain the target molecular weight was found to be 0.22 mole.

As a second stage, 0.22 mole of t-butyl methacrylate was added dropwise in 30 minutes, the reaction was continued for two more hours, and the completion of the reaction was confirmed by GC.

Thereafter, methanol was added to the reaction system to stop the reaction, the reaction solution was added to a large amount of water to deposit a polymer, and the deposited polymer was filtered, washed and dried at 60° C. at a reduced pressure for 5 hours to produce t-butyl methacrylate homopolymer white powders. The polymerization yield was 99.9% of the total amount of t-butyl methacrylate used.

When the obtained t-butyl methacrylate homopolymer was measured by GPC, was a monodisperse polymer having an Mn of 6,000 and an Mw/Mn of 1.09.

It was confirmed from the above results that a t-butyl methacrylate homopolymer having a target molecular weight was obtained by the two stage polymerization of the present invention.

EXAMPLE 4

The following living anionic polymerization of a butadiene-styrene random copolymer (molar ratio of 1:1) was carried out with a target Mn of 20,000.

In a nitrogen atmosphere, 10.8 mmols of n-butyl lithium was added to 1,000 g of tetrahydrofuran, the temperature was kept at −40 C. under agitation, 2.22 moles of an equimolar monomer mixture of butadiene and styrene was added dropwise in one hour as a first stage, the reaction was continued for two more hours, and the completion of the reaction was confirmed by GC. when the reaction solution was analyzed by GPC, Mn was found to be 16,300 and the amount of the equimolar monomer mixture required to obtain the target molecular weight was found to be 0.50 mole.

As a second stage, 0.50 mole of the equimolar monomer mixture was added dropwise in 30 minutes, the reaction was continued for two more hours, and the completion of the reaction was confirmed by GC.

Thereafter, methanol was added to the reaction system to stop the reaction, the reaction solution was added to a large amount of methanol to deposit a polymer, and the deposited polymer was filtered, washed and dried at 60° C. at a reduced pressure for 5 hours to produce butadiene-styrene random copolymer white powders. The polymerization yield was 99.0% of the total amount of the monomer mixture used.

When the obtained random copolymer was measured by GPC, it was a monodisperse polymer having an Mn of 20,080 and an Mw/Mn of 1.06 and the copolymerization ratio (molar ratio) measured by $^{13}C$ NMR of butadiene to styrene was 1/1.

It was confirmed from the above results that a butadiene-styrene random copolymer having a target molecular weight was obtained by the two stage polymerization of the present invention.

EXAMPLE 5

The following living anionic polymerization of a random copolymer of 1-adamantyl methacrylate and t-butyl methacrylate (molar ratio of 1:1) was carried out with a target Mn of 12,000.

In a nitrogen atmosphere, 20 mmols of s-butyl lithium was added to 1,000 g of tetrahydrofuran, the temperature was kept at −60° C. under agitation, 1.0 mole of an equimolar monomer mixture of 1-adamantyl methacrylate (synthesized from 1-adamantanol and methacrylic acid chloride, distillation purified product) and t-butyl methacrylate was added dropwise in one hour, the reaction was continued for two more hours, and the completion of the reaction was confirmed by GC. When the reaction solution was analyzed by GPC, Mn was found to be 9,100 and the amount of the equimolar monomer mixture required to obtain the target molecular weight was found to be 0.32 mole.

As a second stage, 0.32 mole of the equimolar monomer mixture was added dropwise in 30 minutes, the reaction was continued for two more hours, and the completion of the reaction was confirmed by GC.

Thereafter, methanol was added to the reaction system to stop the reaction, the reaction solution was added to a large amount of water to deposit a polymer, and the deposited polymer was filtered, washed and dried at 60° C. at a reduced pressure for 5 hours to produce white powders of a 1-adamantyl methacrylate-t-butyl methacrylate random copolymer. The polymerization yield was 98.8% of the total amount of the monomer mixture used.

When the obtained random copolymer was measured by GPC, it was a monodisperse polymer having an Mn of 12,130 and an Mw/Mn of 1.15 and the copolymerization ratio (molar ratio) measured by $^{13}CNMR$ of 1-adamantyl methacrylate to t-butyl methacrylate was 1/1.

It was confirmed from the above results that a random copolymer of 1-adamantyl methacrylate and t-butyl methacrylate having a target molecular weight was obtained by the two stage polymerization of the present invention.

EXAMPLE 6

A living anionic polymerization of p-vinylphenol was carried out with a target number average molecular weight of 4,000.

The polymer of alkenylphenol was obtained by a two stage polymerization. The first stage polymerization consisted of titrating 0.852 mole of p-tert-butoxystyrene (trade name: Hokko-PTBST produced by Hokko chemicals Industry, Ltd., containing 25 ppm of water and 200 ppm of tert-butyl catechol, and hereinafter abbreviated as PTBST), in one hour, into a solvent mixture comprising 760 g of toluene (containing 85 ppm of water, commercial product) and 40 g of tetrahydrofuran (containing 60 ppm of water, also available in the market, and hereinafter abbreviated as THF), in the presence of 34.6 millimoles of n-butyl lithium, in the atmosphere of nitrogen, kept at −40° C., and under agitation; the reaction mixture was kept under the same conditions for two hours for completion of the reaction; and the reaction mixture was analyzed by gas chromatography (hereinafter abbreviated as GC). For confirmation of completion of the reaction. The reaction mixture was analyzed by GPC, and the number average molecular weight (hereinafter abbreviated as Mn) was confirmed to be 4,850, which showed that the quantity of PTBST required to achieve the targeted molecular weight was 0.179 mole.

The second stage polymerization was carried out by titrating 0.179 mole of PTBST in 30 minutes, and the reaction mixture was kept under the same conditions for two more hours for completion of the reaction, which was confirmed by GC.

Then, water was added to the reaction mixture to stop the reaction; the polymer was separated by adding a large quantity of methanol to the reaction mixture; the separated polymer was filtered, washed, and dried under a reduced pressure for five hours at 60° C. to give the polymer of PTBST in a white powder. The polymerization yield was 99.5% against the total PTBST used.

The Mn was confirmed to be 6,000 by GPC, which well met the estimation, and the Mw/Mn ratio was 1.10, which proved that the polymer was of narrow polydispersity.

The polymer of PTBST was then dissolved into 10 g of dioxane to give a 30% solution; 3 g of concentrated hydrochloric acid was added to this solution; the mixture was kept under the same condition to complete the reaction; the solution was added to a large quantity of n-hexane to separate the polymer; and the polymer was filtered, washed, and dried under a reduced pressure to give 6.7 g of a white powder.

The polymer used for this reaction and the polymer finally obtained were analyzed by the $^1$H NMR; where comparison of the two data revealed that a peak in the former, which is in the vicinity of 1.3 ppm and caused by the tert-butyl group, disappeared in the latter. Also, the comparison of the infrared spectra (hereinafter abbreviated as IR) revealed that the absorption bands at 390 cm$^{-1}$ and at 1,360 cm$^{-1}$ in the former, which are caused by the tert-butyl group, disappeared in the latter, and that a new broad absorption band caused by a hydroxyl group was observed in the vicinity of 3,300 cm$^{-1}$. It was confirmed from these analyses that the debutylation reaction in the polymer of PTBST was complete.

The obtained polymer was confirmed to be of narrow polydispersity, having an Mn of 4,090 and had an Mw/Mn ratio of 1.10.

It was confirmed from these results that a homopolymer of p-vinylphenol having a target molecular weight was obtained by the two stage polymerization of the present invention.

EXAMPLE 7

A living anionic polymerization of p-vinylphenol was carried out to obtain a homopolymer with a target number average molecular weight of 20,000. Toluene, THF, and PTBST used had the same quality levels as those used in Example 6.

The first stage polymerization was carried out by titrating 0.454 mole of PTBST in one hour into a solvent mixture consisting of 730 g of toluene and 170 g of THF, in the presence of 9.1 millimoles of n-butyl lithium, under agitation, and at −40° C.; the reaction was continued for three more hours; and completion of the reaction was confirmed by GC. The GPC measurement showed that the Mn was 15,000, and the quantity of PTBST required to achieve the target molecular weight was calculated to be 0.122 mole.

The second-stage polymerization was carried out by titrating 0.122 mole of PTBST in one hour, the reaction was continued for two more hours, and completion of the reaction was confirmed by GC.

Water was added to stop the reaction, the obtained polymer was treated in the same way as in Example 6, and the polymer of PTBST was obtained in a white powder. The yield was 99.3% against the total PTBST used.

The Mn of the PTBST polymer obtained was 29,000, which met the target value, and the Mw/Mn ratio was 1.12, which showed that the polymer was of narrow polydispersity.

The obtained PTBST polymer (10 g) was dissolved into dioxane to give a 10% solution, and was treated in the same way as in Example 6 to give 6.8 g of the white powder.

The $^1$H NMR and IR measurements were carried out on both polymers (PTBST polymer used and the final polymer) in the same way as in Example 6, and the comparison revealed that debutylation was complete.

The final polymer had an Mn of 19,800, and had an Mw/Mn ratio of 1.12, which showed that the final polymer was of narrow polydispersity.

It was confirmed from the results above that the two stage polymerization of this invention successfully gave a p-vinylphenol polymer having the targeted molecular weight.

EXAMPLE 8

A living anionic homopolymerization of p-isopropenylphenol was carried out with a target Mn of 10,000.

In an atmosphere of nitrogen, 40.0 millimoles of sodium dispersion in sodium-kerosene was added to a solvent mixture consisting of 560 g of THF having the same quality as in Example 6 and 240 g of n-hexane (distilled, and containing 30 ppm of water); the temperature was kept at −60° C. under agitation; 0.842 mole of the first-stage p-tert-butoxy-α-methylstyrene (trade name: Hokko-PTBMST, produced by Hokko Chemicals Industry, Ltd., containing 80 ppm of water, and hereinafter abbreviated as PTBMST) was titrated into the solvent mixture in one hour; the reaction was continued for two more hours; and completion of the reaction was confirmed by GC. The reaction mixture was analyzed by GPC, the Mn was found to be 12,700, and the quantity of PTBMST required to achieve the final targeted value was calculated as 0.098 mole.

The second stage monomer, 0.098 mole of PTBMST, was titrated in 30 minutes, the reaction was continued for two more hours, and completion of reaction was confirmed by GC.

Water was added to the reaction mixture to stop the reaction, the reaction mixture was treated as in Example 6, and a white powder of PTBMST polymer was obtained. The polymer yield was 99.0% against the total PTBMST used.

The PTBMST polymer obtained had an Mn of 14,800, which well met the targeted value, and had an Mw/Mn ratio of 1.18, which showed that the polymer was of narrow polydispersity.

The PTBMST polymer (10 g) was dissolved in dioxane to give a 30% solution, and the mixture was treated in the same way as in Example 6 to give 7.0 g of the polymer in a white powder.

The $^1$H NMR and IR measurements were made as in Example 6 on the PTBMST polymer used and the final polymer obtained, and the comparison showed that the debutylation reaction was complete.

The final polymer had an Mn of 10,400, and an Mw/Mn ratio of 1.18, which showed that the polymer was of narrow polydispersity.

The results above proved that the two stage polymerization of the present invention successfully gave the p-isopropenyl phenol homopolymer having the targeted molecular weight.

EXAMPLE 9

A living anionic random copolymerization of p-vinylphenol with styrene (1/1 by molarity) was carried out with the final Mn targeted at 8,000. The qualities of toluene, THF, and PTBST used were the same as in Example 6.

In an atmosphere of nitrogen, 30.0 millimoles of n-butyl lithium was added to a solvent mixture consisting of 760 g of toluene and 40 g of THF, and the first stage polymerization was carried out by titrating the equimolar mixture of PTBST (0.643 mole) and styrene (0.643 mole) in one hour under agitation and at −40° C.; the reaction was continued for three more hours; and completion of the reaction was confirmed by GC. The reaction mixture was analyzed by GPC, which showed that the Mn was 9000, and the quantity of the second-stage monomer required to achieve the targeted final molecular weight was calculated to be 0.143 mole.

The second stage polymerization was carried out by titration of 0.143 mole of the equimolar monomer mixture mentioned above in 30 minutes, followed by the holding for two more hours of the reaction mixture under the same conditions to complete the reaction; and completion was confirmed by GC.

Water was added to the mixture to terminate the reaction, the mixture was treated as in Example 6, and a random copolymer of PTBST-St was obtained in a white powder. The polymer yield was 99.6% against the total monomers used.

The final PTBST-St random copolymer had an Mn of 10,200, which met the targeted value, and had an Mw/Mn ratio of 1.10, which showed that the final polymer was of narrow polydispersity.

The obtained PTBST-St random copolymer (10 g) was dissolved in dioxane to give a 10% solution, and a polymer in a white powder was obtained in the same way as in Example 6.

The PTBST-St random copolymer and the final polymer were analyzed by the $^1$H NMR and IR in the same way as in Example 6. The comparison of the two results showed that the debutylation was complete.

The final polymer had an Mn of 8,100 and has an Mw/Mn ratio of 1.10, which proved that the polymer was of narrow polydispersity, and the styrene content was 49.5% according to the $^{13}$CNMR measurement.

The results above proved that the two-stage polymerization of this invention successfully gave the random copolymer consisting of p-vinylphenol and styrene having the target molecular weight.

COMPARATIVE EXAMPLE 1

A living anionic homopolymerization of p-vinylphenol was carried out with a target molecular weight of 4,000.

In an atmosphere of nitrogen, 34.6 millimoles of n-butyl lithium was added to a solvent mixture consisting of 760 g of toluene and 40 g of THF; 1.031 moles of PTBST having the same quality level as in Example 1 was titrated into the solvent mixture in one hour under agitation and at −40° C.; the reaction was continued for two more hours; and completion of the reaction was confirmed by GC.

Then, water was added to the mixture to stop the reaction, the reaction mixture was treated in the same way as in Example 6 to give a white powder of PTBST polymer. The yield in polymerization was 99.5%.

The PTBST polymer obtained had an Mn of 8200, and had an Mw/Mn ratio of 1.15, which showed that the polymer was of narrow polydispersity.

Then, the PTBST polymer (10 g) was dissolved into dioxane to give a 30% solution, from which 6.7 g of a white powder was obtained as in Example 6.

The PTBST polymer used for the reaction and the final polymer were analyzed by the $^1$H NMR and IR as in Example 6; and the comparison of the two measurements showed that the debutylation reaction was complete.

The final polymer had an Mw/Mn of 1.15, which showed that the polymer was of narrow polydispersity, while the Mn was 5,600, which was not close enough to the target value for the final p-vinylphenol homopolymer.

COMPARATIVE EXAMPLE 2

A first stage polymerization was carried out with the quantity of PTBST changed to 0.230 mole and with other conditions kept the same as in Example 2. The Mn of the reaction mixture was measured to be 11,300, and the quantity of PTBST required to achieve the target final molecular weight was calculated as 0.354 mole.

A second stage polymerization was carried out with the level of PTBST changed to 0.354 mole and with other conditions kept the same as in Example 2 and the reaction mixture was treated in the same way. PTBST polymer was obtained in a white powder, and the polymerization yield was 99.0% against the total PTBST used.

The final PTBST polymer obtained had an Mn of 23700, which did not meet the target value, and had an Mw/Mn ratio of 1.68, which showed that the polymer was multidispersed.

Thus, the polymer produced by the method of the present invention has a controlled molecular weight and a controlled molecular-weight distribution, and therefore is useful as a raw material including the one as a resist-coating material.

What is claimed is:

1. A process for producing a monodisperse polymer which has a number-average molecular weight from 1,000 to 100,000 and a molecular weight distribution Mw (weight-average molecular weight)/Mn (number-average molecular weight)=1.00 through 1.50, comprising homopolymerizing or random copolymerizing an anionic polymerizable compound by living anionic polymerization using an organic alkali metal and/or an alkali metal as a polymerization initiator, wherein a target molecular weight is obtained by adding the compound divided into multiple steps, and wherein in a first step the polymerization is allowed to continue to completion without adding additional amounts of the compound subsequent to an initial addition of the compound at a beginning of the polymerization in the first step.

2. The process for producing a monodisperse polymer according to claim 1 wherein the anionic polymerizable compound is a conjugated diene, vinyl aromatic compound or (meth)acrylic acid ester.

3. The process for producing a monodisperse polymer according to claim 1 wherein the compound is divided into two portions and added separately.

4. The process for producing a monodisperse polymer according to claim 3 wherein first stage polymerization is carried out using a compound in an amount corresponding to 50/100 to 95/100 the target molecular weight thereof and then second stage polymerization is carried out by adding the amount of the compound required to achieve the target molecular weight.

5. A process for producing narrow polydispersity alkenylphenol polymer which has a number-average molecular weight from 1,000 to 100,000 and a molecular weight distribution Mw (weight-average molecular weight)/Mn (number-average molecular weight)=1.00 through 1.50, comprising subjecting a compound, of which OH group of the alkenyl phenol is protected with a saturated aliphatic protecting group, to homopolymerization or random copolymerization with a copolymerizable monomer; and thereafter, eliminating the saturated aliphatic protecting group to obtain an alkenylphenol polymer:

said compound being represented by the following formula

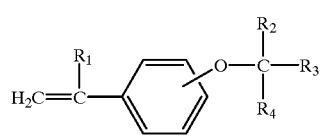
(I)

where $R_1$ is hydrogen or methyl group, and $R_2$, $R_3$ and $R_4$ are respectively and independently hydrogen or an alkyl group containing 1 through 6 carbon atoms;

said homopolymerization or copolymerization being a living anionic polymerization using an organic alkali metal compound and/or an alkali metal as the initiator;

said process being characterized in that a polymerization for adjusting the molecular weight is carried out by adding said monomers divided into multiple steps, and wherein in a first step the polymerization is allowed to continue to completion without adding additional amounts of the compound subsequent to an initial addition of the compound at the beginning of the polymerization in the first step.

6. The process for producing narrow polydispersity alkenylphenol polymer according to claim 5, wherein said monomer copolymerizable with the compound of formula I is a vinyl aromatic compound and/or a conjugated diene.

7. The process for producing narrow polydispersity alkenylphenol polymer according to claim 5, wherein the polymerization for adjusting the molecular weight is carried out by adding said monomers divided into two steps.

8. The process for producing narrow polydispersity alkenylphenol polymer according to claim 5 wherein the polymerization for adjusting the molecular weight is carried out by a first step preliminary polymerization of the monomers in amounts corresponding to 50/100 through 95/100 of the target molecular weight and subsequent steps wherein the monomers are successively added in amounts required for obtaining the target molecular weight.

9. The process for producing narrow polydispersity alkenylphenol polymer according to claim 7 wherein the polymerization for adjusting the molecular weight is carried out by a first step preliminary polymerization of the monomers in amounts corresponding to 50/100 through 95/100 of the target molecular weight and second step wherein the monomers are added in amounts required for obtaining the target molecular weight.

10. The process for producing narrow polydispersity alkenylphenol polymer according to claim 5 wherein said living anionic polymerization is carried out in a polymerization solvent which is a mixture of a cyclic ether and one or more nonpolar solvents selected from the group consisting of aliphatic hydrocarbons, alicyclic hydrocarbons and aromatic hydrocarbons.

11. The process for producing narrow polydispersity alkenylphenol polymer according to claim 10 wherein the polymerization solvent contains 1 to 50% by weight of the cyclic ether.

12. The process for producing a monodisperse polymer according to claim 1, wherein said living anionic polymerization is carried out in a polymerization solvent which is a mixture of a cyclic ether and one or more nonpolar solvents selected from the group consisting of aliphatic hydrocarbons, alicyclic hydrocarbons and aromatic hydrocarbons.

13. The process for producing a monodisperse polymer according to claim 12, wherein the polymerization solvent contains 1 to 5% by weight of the cyclic ether.

* * * * *